(12) United States Patent
Terushita et al.

(10) Patent No.: US 9,810,425 B2
(45) Date of Patent: Nov. 7, 2017

(54) PULVERIZED COAL BURNER FOR OXYFUEL COMBUSTION BOILER

(75) Inventors: Shuuhei Terushita, Tokyo (JP); Toshihiko Yamada, Tokyo (JP); Shuzo Watanabe, Tokyo (JP); Terutoshi Uchida, Tokyo (JP)

(73) Assignees: IHI Corporation, Tokyo (JP); ELECTRIC POWER DEVELOPMENT CO., LTD., Tokyo (JP)

( * ) Notice: Subject to any disclaimer, the term of this patent is extended or adjusted under 35 U.S.C. 154(b) by 1056 days.

(21) Appl. No.: 12/920,694

(22) PCT Filed: Mar. 6, 2008

(86) PCT No.: PCT/JP2008/000476
§ 371 (c)(1),
(2), (4) Date: Nov. 8, 2010

(87) PCT Pub. No.: WO2009/110038
PCT Pub. Date: Sep. 11, 2009

(65) Prior Publication Data
US 2011/0126780 A1    Jun. 2, 2011

(51) Int. Cl.
*F22B 31/00*  (2006.01)
*F23D 1/00*  (2006.01)
*F23L 7/00*  (2006.01)

(52) U.S. Cl.
CPC .............. *F23D 1/00* (2013.01); *F23L 7/007* (2013.01); *F23D 2201/10* (2013.01);
(Continued)

(58) Field of Classification Search
USPC ............................................. 122/10; 110/262
See application file for complete search history.

(56) References Cited

U.S. PATENT DOCUMENTS 4,907,962 A * 3/1990 Azuhata et al. ............... 431/174
5,954,855 A * 9/1999 Gitman et al. ............... 75/10.42
(Continued)

FOREIGN PATENT DOCUMENTS

AU    2007222784 B2    2/2011
DE    10 2006 011 326 A1    9/2007
(Continued)

OTHER PUBLICATIONS

JP09021506A—Machine Translation.*
Extended Search Report dated May 7, 2012 in European Patent Application No. 08720362.6-2301.

*Primary Examiner* — Nathaniel Herzfeld
(74) *Attorney, Agent, or Firm* — Oblon, McClelland, Maier & Neustadt, L.L.P.

(57) ABSTRACT

A pulverized coal burner for an oxyfuel combustion boiler which attains uniform combustion from a pulverized coal burner and which constrains a temperature rise of an oxygen injection nozzle is provided. The burner includes burner inner and outer cylinders arranged to penetrate a wind box and come close to a throat portion. A pulverized coal feed passage is provided between the burner inner and outer cylinders. A plurality of oxygen injection devices are arranged outwardly of the burner outer cylinder so as to directly feed oxygen ahead of the burner outer cylinder.

7 Claims, 2 Drawing Sheets

(52) U.S. Cl.
CPC ............... *F23D 2900/00006* (2013.01); *F23L 2900/07005* (2013.01); *Y02E 20/344* (2013.01)

(56) References Cited

U.S. PATENT DOCUMENTS

| | | | | |
|---|---|---|---|---|
| 6,152,051 | A * | 11/2000 | Kiyama | F23D 1/00 |
| | | | | 110/104 B |
| 6,237,510 | B1 * | 5/2001 | Tsumura | F23D 1/00 |
| | | | | 110/234 |
| 6,298,796 | B1 * | 10/2001 | Okazaki et al. | 110/345 |
| 6,389,998 | B2 * | 5/2002 | Mukai et al. | 110/347 |
| 6,935,251 | B2 | 8/2005 | Marin et al. | |
| 2002/0090583 | A1 * | 7/2002 | Cain | F23N 1/02 |
| | | | | 431/2 |
| 2002/0096809 | A1 * | 7/2002 | Shver et al. | 266/186 |
| 2002/0144636 | A1 * | 10/2002 | Tsumura | F23C 5/32 |
| | | | | 110/347 |
| 2003/0008255 | A1 * | 1/2003 | Finke | F23C 9/006 |
| | | | | 431/215 |
| 2004/0234912 | A1 * | 11/2004 | Sarv et al. | 431/183 |
| 2007/0231761 | A1 * | 10/2007 | Rosen et al. | 431/350 |
| 2007/0287109 | A1 * | 12/2007 | Lodin | F23L 7/007 |
| | | | | 431/10 |
| 2008/0184919 | A1 * | 8/2008 | D'Agostini | F23C 6/045 |
| | | | | 110/263 |
| 2009/0031933 | A1 | 2/2009 | Ookawa et al. | |
| 2009/0272300 | A1 | 11/2009 | Yamada et al. | |
| 2010/0058961 | A1 * | 3/2010 | Fujimori et al. | 110/261 |
| 2011/0139048 | A1 * | 6/2011 | Tamura et al. | 110/262 |

FOREIGN PATENT DOCUMENTS

| | | | |
|---|---|---|---|
| JP | 63-21406 | | 1/1988 |
| JP | 4-244504 | A | 9/1992 |
| JP | 5-26409 | A | 2/1993 |
| JP | 5-168853 | A | 7/1993 |
| JP | 5-172305 | A | 7/1993 |
| JP | 5-231609 | A | 9/1993 |
| JP | 7-318016 | A | 12/1995 |
| JP | 09021506 | A * | 1/1997 |
| JP | 2001 200308 | | 7/2001 |
| JP | 2001-235103 | A | 8/2001 |
| JP | 2001-336736 | A | 12/2001 |
| JP | 2007 57228 | | 3/2007 |
| JP | 2007-147162 | A | 6/2007 |
| WO | WO 2007/061106 | A1 | 5/2007 |
| WO | WO 2007/101427 | A1 | 9/2007 |

* cited by examiner

PULVERIZED COAL BURNER FOR OXYFUEL COMBUSTION BOILER

TECHNICAL FIELD

The present invention relates to a pulverized coal burner for an oxyfuel combustion burner.

BACKGROUND ART

To prevent global warming in recent years, it is desired to reduce emissions of greenhouse gases such as carbon dioxide and technologies are being developed for capturing carbon dioxide in a combustion exhaust gas emitted from an oxyfuel combustion boiler for a storage process in ocean or in the underground formation.

Such an oxyfuel combustion boiler comprises an oxygen introduction passage for introduction of oxygen to an air feed passage connected to a wind box on an inlet side of an oxyfuel combustion boiler body, and an exhaust gas circulation passage branched from an exhaust gas passage connected to an outlet side of the oxyfuel combustion boiler body for connection with the air feed passage. Upon start-up, air is introduced through the air feed passage to the oxyfuel combustion boiler body for combustion of fuel. After completion of the start-up, dampers, etc., disposed in the passages are switched to circulate an exhaust gas discharged from the oxyfuel combustion boiler body through the exhaust gas circulation passage to the oxyfuel combustion boiler body while oxygen is introduced through the oxygen introduction passage to the oxyfuel combustion boiler body to perform the oxyfuel combustion of the fuel while constraining reduction of oxygen concentration due to the circulation of the exhaust gas to thereby increase a concentration of carbon dioxide in the exhaust gas, the carbon dioxide being captured from a portion of the exhaust gas.

The oxyfuel combustion boiler comprises a pulverized coal burner which is composed of an oil burner and a pulverized coal feed passage, and an oxygen injection nozzle which supplies the pulverized coal feed passage with oxygen to mix and burn pulverized coal, etc., with air from the wind box (e.g., Patent Literature 1).

For example, Patent Literatures 2 to 5 describe techniques related to such an oxyfuel combustion boiler.
[Patent Literature 1] JP 07-318016A
[Patent Literature 2] JP 05-231609A
[Patent Literature 3] JP 2001-235103A
[Patent Literature 4] JP 05-168853A
[Patent Literature 5] JP 2007-147162A

SUMMARY OF INVENTION

Technical Problems

However, if an oxyfuel combustion boiler is simply provided with a pulverized coal burner and an oxygen injection nozzle, etc., oxygen is unable to be fed properly so that, disadvantageously, the combustion from the pulverized coal burner becomes non-uniform and a tip of the oxygen injection nozzle and a tip of the pulverized coal burner reach abnormally high temperatures. Especially, if the oxygen injection nozzle is disposed in the pulverized coal feed passage as described in the prior art literatures, oxygen is not sufficiently mixed with pulverized coal, resulting in failure of uniform combustion.

The invention was made in view of the above and has its object to provide a pulverized coal burner for an oxyfuel combustion boiler which attains uniform combustion with a pulverized coal burner and which constrains a temperature rise of oxygen injection means.

Solution to Problems

The invention is directed to a pulverized coal burner for an oxyfuel combustion boiler comprising burner inner and outer cylinders which pass through a wind box and come close to a throat portion, a pulverized coal feed passage provided between the burner inner and outer cylinders and a plurality of oxygen injection means outwardly of the burner outer cylinder for directly feeding oxygen ahead of the burner outer cylinder.

In the pulverized coal burner for the oxyfuel combustion boiler, preferably, each of the oxygen injection means is disposed at a position preventing a tip on the injection side from getting ahead of a tip of the burner outer cylinder and is configured to prevent injected oxygen from hitting a tip of the burner outer cylinder.

In the pulverized coal burner for the oxyfuel combustion boiler, preferably, the plurality of oxygen injection means are arranged circumferentially and equidistantly around a burner axis.

In the pulverized coal burner for the oxyfuel combustion boiler, preferably, each of the oxygen injection means comprises an oxygen injection nozzle for injection of oxygen and an oxygen feed passage which supplies oxygen to the oxygen injection nozzle through a system separated from air of the wind box.

Advantageous Effects of Invention

According to a pulverized coal burner for an oxyfuel combustion boiler of the invention, oxygen is directly fed to pulverized coal and/or flame outwardly of a burner outer cylinder which makes up a pulverized coal feed passage, so that excellent effects of making uniform combustion from the pulverized coal burner and constraining a temperature rise of oxygen injection means are achievable.

Figure 1:
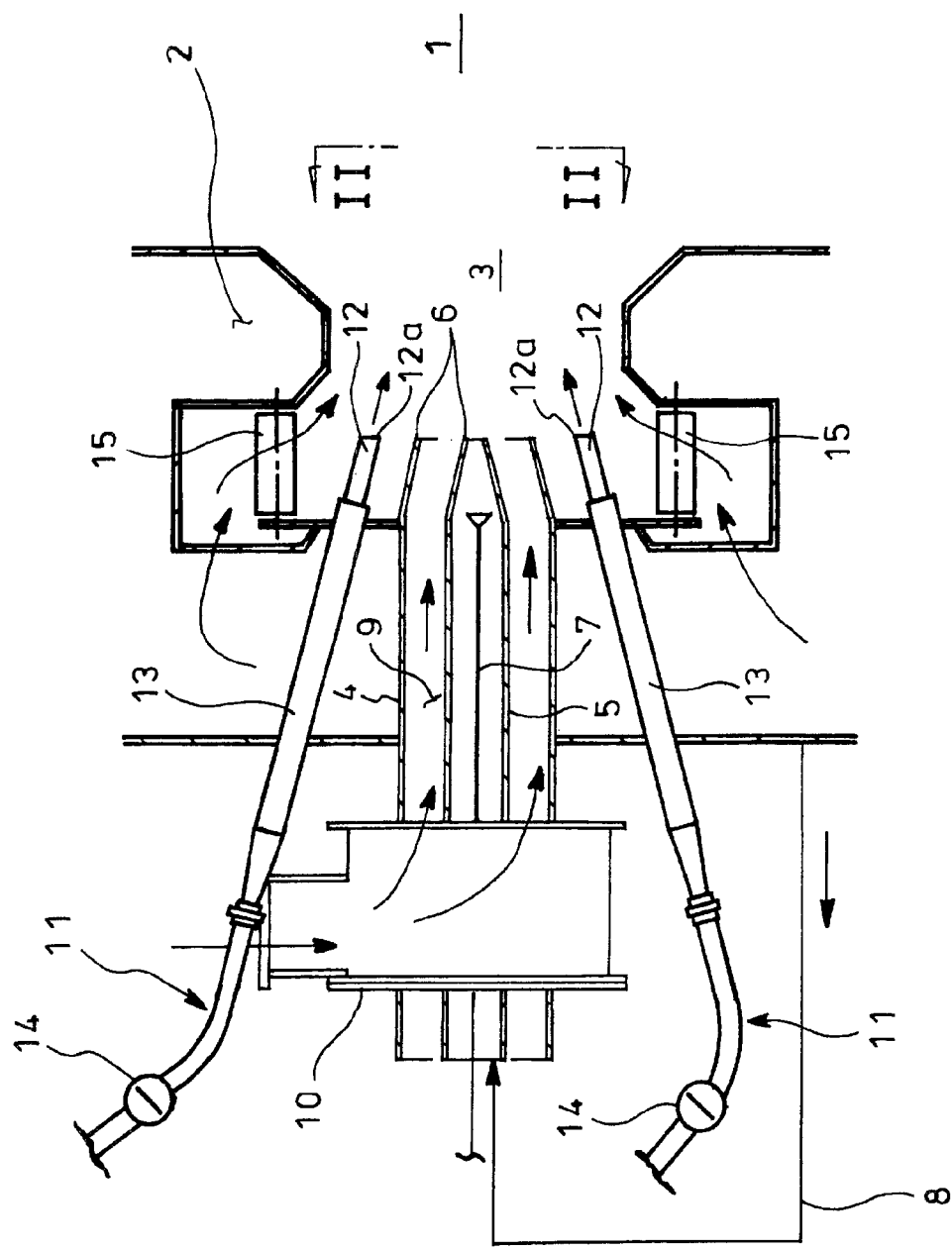
FIG. 1 is a conceptual diagram of a configuration of an embodiment of the invention.

REFERENCE SIGNS LIST 2 wind box
3 throat portion
4 burner outer cylinder
5 burner inner cylinder
6 tip portion
7 oil burner
9 pulverized coal feed passage
11 oxygen injection means
12 oxygen injection nozzle
12a tip
13 oxygen feed passage

DESCRIPTION OF EMBODIMENT

An embodiment of the invention will be described with reference to the accompanying drawings.

Figure 2:
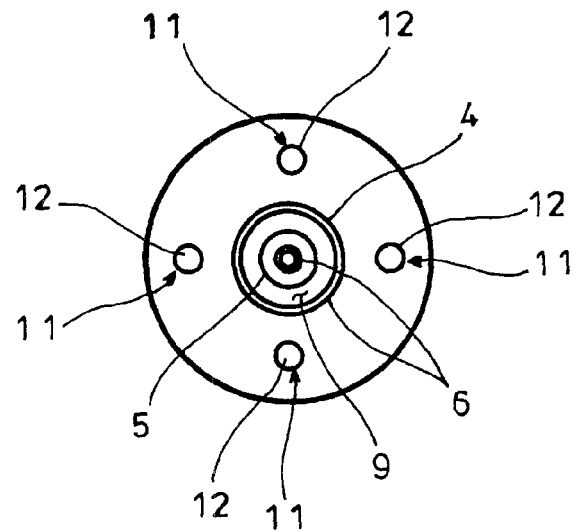
FIG. 2 is a view looking in a direction of arrows II in FIG. 1.
Figure 3:
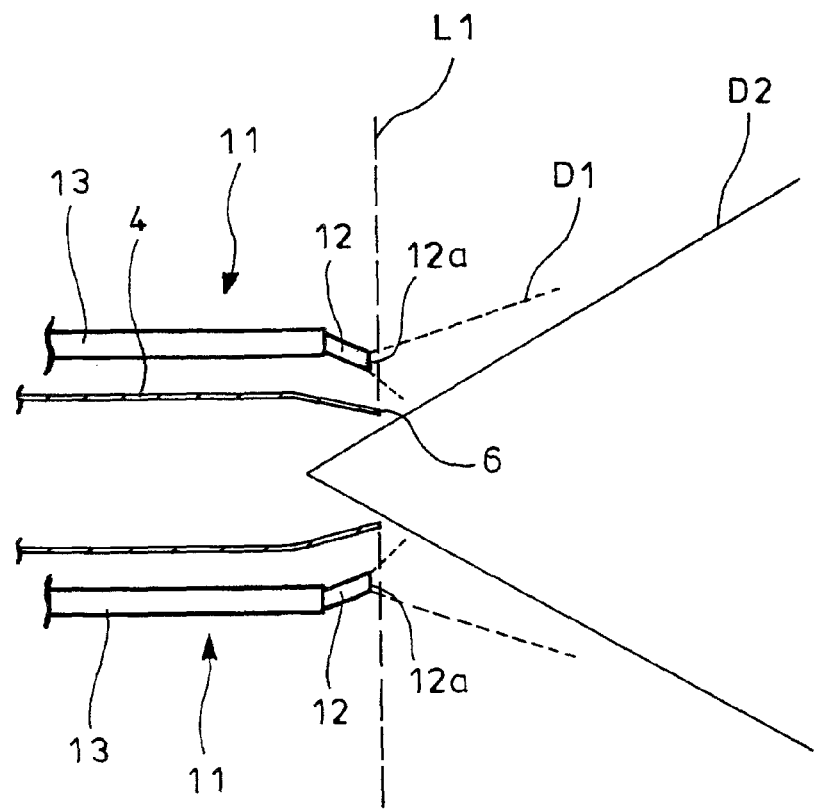
FIG. 3 is a conceptual diagram of a state of injecting oxygen from oxygen injection means in the embodiment of the invention.

FIGS. 1 to 3 show the embodiment of a pulverized coal burner for an oxyfuel combustion boiler of the invention.

The pulverized coal burner for the oxyfuel combustion boiler of the embodiment comprises burner outer and inner cylinders 4 and 5 concentrically disposed to penetrate a wind box 2 attached to an oxyfuel combustion boiler 1 and to come closer to a throat portion 3 formed in a furnace wall (not shown) of the oxyfuel combustion boiler 1 and tip portions 6 of the burner outer and inner cylinders 4 and 5 are opened toward the throat portion 3.

The burner inner cylinder 5 is axially provided with an oil burner 7. The oil burner 7 is fed with fuel such as oil from outside of the burner inner cylinder 5; introduced into the burner inner cylinder 5 is air of the wind box 2 via an introduction line 8.

Formed between the burner inner and outer cylinders 5 and 4 is a pulverized coal feed passage 9 allowing distribution of pulverized coal. The burner outer cylinder 4 is provided with a pulverized coal introducing unit 10 located outside of the wind box 2. The pulverized coal introducing unit 10 is connected to a feed line (not shown) fed with pulverized coal from a mill (not shown), etc., and has a configuration of feeding pulverized coal to the pulverized coal feed passage 9.

Disposed outwardly of the burner outer cylinder 4 are a plurality of (four in FIG. 2) oxygen injection means 11 which are circumferentially equidistantly arranged around the oil burner 7 to penetrate the wind box 2 and to come close to the throat portion 3.

The oxygen injection means 11 comprise a plurality of oxygen injection nozzles 12 for injection of oxygen, pipes of oxygen feed passages 13 arranged as a system separated from air of the wind box 2 for feeding of oxygen to the plural oxygen injection nozzles 12, flow rate adjusting valves 14 arranged in the oxygen feed passages 13 for control of feed amounts of oxygen and an air separation unit (not shown) which supplies oxygen to the pipes of the oxygen feed passages 13.

Each of the oxygen injection nozzle 12 of the oxygen injection means 11 is disposed at a position (closer to the furnace wall of the oxyfuel combustion boiler 1) to prevent a tip 12a on the injection side from getting ahead of a tip of the burner outer cylinder 4 (line L1 in FIG. 3) and the injection direction is adjusted to prevent injected oxygen from colliding against the tip of the burner outer cylinder 4. If the oxygen injection means 11 has a configuration which prevents the injected oxygen from hitting the tip of the burner outer cylinder 4, the pipes of the oxygen feed passages 13 and the oxygen injection nozzles 12 may incline toward the axis of the oil burner 7 as shown in FIG. 1 or the pipes of the oxygen feed passages 13 may be disposed substantially in parallel with the burner outer cylinder 4 as shown in FIG. 3. In FIG. 3, D1 indicates an injection direction of oxygen; and D2, an injection direction of pulverized coal and flame.

On the other hand, an air register 15 giving a swirling force to secondary air for combustion fed from the wind box 2 to the furnace of the oxyfuel combustion boiler is disposed between the wind box 2 and the throat portion 3 to surround the throat portion 3 outwardly of the oxygen injection means 11.

Next, Operations of the embodiment in the invention will be described.

For burning of pulverized coal by the pulverized coal burner for the oxyfuel combustion boiler 1, the pulverized coal is fed from the pulverized coal feed passage 9 and ejected through a tip portion 6 of the burner outer cylinder 4 to generate flame in the throat portion 3, and the oxygen injection means 11 directly feed oxygen to the throat portion 3 forward of the burner outer cylinder 4 to stabilize the flame through mixing with oxygen, reducing unburned combustibles in ash.

To the pulverized coal ejected through the tip portion 6 of the burner outer cylinder 4, the oxygen injection nozzles 12 inject oxygen uniformly and circumferentially of the burner outer cylinder 4 such that oxygen does not hit the tip of the burner outer cylinder 4 to sufficiently mix oxygen with pulverized coal and/or flame and to adjust the injection state in direction and degree of pulverized coal and/or flame.

Thus, according to the embodiment, oxygen is directly fed to the pulverized coal and/or frame circumferentially of the burner outer cylinder 4 providing the pulverized coal feed passage 9 to adjust the injection state, so that the combustion from the pulverized coal burner can be made uniform and the temperature rise can be constrained in the oxygen injection nozzles 12 of the oxygen injection means 11 and the burner outer cylinder 4.

When the oxygen injection means 11 is disposed at a position preventing the tip on the injection side from getting ahead of the tip of the burner outer cylinder 4 and is configured to prevent the injected oxygen from hitting the tip of the burner outer cylinder 4 in the embodiment, oxygen is fed without colliding against the tip portion 6 of the burner outer cylinder 4 and, therefore, the combustion from the pulverized coal burner can be made uniform by preventing a disturbed flow due to collision of the oxygen and the tip portion 6. When the tip of the oxygen injection nozzle 12 is disposed at a position preventing the tip from getting ahead of the tip of the burner outer cylinder 4, the flame does not hit the tip of the oxygen injection nozzle 12 and the temperature rise can be constrained in the oxygen injection nozzle 12. With the configuration preventing the injected oxygen from hitting the tip of the burner outer cylinder 4, the temperature rise can be constrained in the burner outer cylinder 4.

When the plural oxygen injection means 11 are arranged circumferentially and equidistantly around the burner axis in the embodiment, the feed amount and the injection pressure of the injected oxygen may be made uniform circumferentially, thereby making the combustion from the pulverized coal burner uniform.

When the oxygen injection means 11 comprises the oxygen injection nozzle 12 for injection of oxygen and the oxygen feed passage 13 which supplies oxygen to the oxygen injection nozzle 12 through a system separated from air of the wind box 2 in the embodiment, the combustion from the pulverized coal burner can be favorably made uniform and the temperature rise can be constrained in the oxygen injection nozzle 12 and the burner outer cylinder 4. If the oxygen injection means 11 is provided with the flow rate adjusting valve 14 or if the oxygen injection nozzle 12 is adjustably disposed, the feed of oxygen may be finely adjustable, the combustion from the pulverized coal burner can be favorably made uniform and the temperature rise can easily be constrained in the oxygen injection nozzle 12 and the burner outer cylinder 4.

It is to be understood that a pulverized coal burner for an oxyfuel combustion boiler according to the invention is not limited to the above embodiment and that various changes and modifications may be made without departing from the scope of the invention. For example, the number of the oxygen injection means is not particularly restricted provided that it is two or more.

The invention claimed is:

1. A pulverized coal burner for an oxyfuel combustion boiler comprising:
   burner inner and outer cylinders which penetrate a wind box and come close to a throat portion;
   a pulverized coal feed passage provided between the burner inner and outer cylinders; and
   a plurality of oxygen injection means positioned outwardly from the burner outer cylinder, penetrating the wind box and coming close to the throat portion for directly feeding oxygen ahead of the burner outer cylinder,
   wherein a tip of the burner outer cylinder is disposed inside of the oxygen injection means and directly adjacent to a tip of the oxygen injection means, the tip of the burner outer cylinder being an outlet surface of the burner outer cylinder perpendicular to a central axis of the burner outer cylinder, the tip of the oxygen injection means being an outlet surface of the oxygen injection means perpendicular to the central axis of the burner outer cylinder, and
   wherein each of the oxygen injection means includes the tip on an injection side disposed behind the tip of the burner outer cylinder to prevent injected oxygen from hitting the tip of the burner outer cylinder and to prevent flame from the tip of the burner outer cylinder from hitting the tip of the oxygen injection means.

2. A pulverized coal burner for an oxyfuel combustion boiler as claimed in claim 1, wherein the plurality of oxygen injection means are arranged circumferentially and equidistantly around a burner axis.

3. A pulverized coal burner for an oxyfuel combustion boiler as claimed in claim 1, wherein each of the oxygen injection means comprises an oxygen injection nozzle for injection of oxygen and an oxygen feed passage which supplies oxygen to the oxygen injection nozzle through a system without using air of the wind box.

4. A pulverized coal burner for an oxyfuel combustion boiler as claimed in claim 3, wherein the oxygen injection nozzles of the oxygen injection means are inclined toward a burner axis.

5. A pulverized coal burner for an oxyfuel combustion boiler as claimed in claim 3, wherein pipes of the oxygen feed passages of the oxygen injection means penetrate the wind box and are inclined toward a burner axis.

6. A pulverized coal burner for an oxyfuel combustion boiler as claimed in claim 3, wherein pipes of the oxygen feed passages of the oxygen injection means are substantially parallel with the burner outer cylinder.

7. A pulverized coal burner for an oxyfuel combustion boiler as claimed in claim 1, further comprising an air register disposed between the wind box and the throat portion so as to surround the throat portion outwardly of the oxygen injection means, the air register providing a swirling force to secondary air for combustion fed from the wind box to a furnace of the oxyfuel combustion boiler.

* * * * *